(12) United States Patent
Li et al.

(10) Patent No.: US 10,146,270 B2
(45) Date of Patent: Dec. 4, 2018

(54) HINGE STRUCTURE AND ELECTRONIC DEVICE

(71) Applicants: Ching-Hua Li, Taipei (TW); Li-Fang Chen, Taipei (TW); Chen-Hsien Cheng, Taipei (TW)

(72) Inventors: Ching-Hua Li, Taipei (TW); Li-Fang Chen, Taipei (TW); Chen-Hsien Cheng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/857,521

(22) Filed: Dec. 28, 2017

(65) Prior Publication Data

US 2018/0196479 A1 Jul. 12, 2018

Related U.S. Application Data

(60) Provisional application No. 62/448,353, filed on Jan. 19, 2017, provisional application No. 62/441,946, filed on Jan. 3, 2017.

(51) Int. Cl.
| | |
|---|---|
| *G06F 1/16* | (2006.01) |
| *F16C 11/10* | (2006.01) |
| *E05D 7/10* | (2006.01) |
| *E05D 11/08* | (2006.01) |

(52) U.S. Cl.
CPC ......... *G06F 1/1681* (2013.01); *E05D 7/1061* (2013.01); *E05D 11/082* (2013.01); *F16C 11/103* (2013.01); *G06F 1/1654* (2013.01); *E05Y 2900/606* (2013.01); *G06F 1/1616* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,317,315 | B1 * | 11/2001 | Lee ..................... | G06F 1/1601 16/254 |
| 6,437,973 | B1 * | 8/2002 | Helot ................... | G06F 1/1616 248/161 |
| 6,530,784 | B1 * | 3/2003 | Yim ..................... | G06F 1/1616 361/679.29 |

(Continued)

*Primary Examiner* — Lisa Lea Edmonds
(74) *Attorney, Agent, or Firm* — JCIPRNET

(57) ABSTRACT

A hinge structure includes a fixing component and a pivoting base. The fixing component includes a fixing base and at least three torsion hooks. The fixing base includes a first sidewall and a second sidewall opposite to each other. The at least three torsion hooks are disposed side by side between the first sidewall and the second sidewall. Each of the torsion hooks includes a fixing end portion and a pressing end portion opposite to each other. The fixing end portion of the torsion hook at center is fixed to the first sidewall, and the pressing end portion is close to the second sidewall. The two fixing end portions of the two torsion hooks at two sides are respectively fixed to the second sidewall, and the two pressing end portions are respectively close to the first sidewall. A pivoting base is rotatably disposed at the torsion hook, and the three pressing end portions respectively press the pivoting base. An electronic device having a hinge structure is further provided.

20 Claims, 11 Drawing Sheets

(56) References Cited

U.S. PATENT DOCUMENTS

| | | | | |
|---|---|---|---|---|
| 6,941,617 B2 * | 9/2005 | Pinto | ............... | E05D 5/04 |
| | | | | 16/297 |
| 7,599,178 B2 * | 10/2009 | Huang | ............... | G06F 1/1632 |
| | | | | 361/679.28 |
| 8,599,542 B1 * | 12/2013 | Healey | ............... | G06F 1/1626 |
| | | | | 345/168 |
| 8,817,457 B1 * | 8/2014 | Colby | ............... | G06F 1/1669 |
| | | | | 206/320 |
| 8,964,363 B2 * | 2/2015 | Hu | ............... | G06F 3/02 |
| | | | | 16/221 |
| 9,007,761 B2 * | 4/2015 | Wolff | ............... | G06F 1/1679 |
| | | | | 361/679.43 |
| 9,036,340 B1 * | 5/2015 | Colby | ............... | G06F 1/1669 |
| | | | | 206/320 |
| D734,762 S * | 7/2015 | Itano | ............... | D14/318 |
| D735,211 S * | 7/2015 | Itano | ............... | D14/318 |
| 9,141,146 B2 * | 9/2015 | Ke | ............... | G06F 1/1632 |
| 9,256,256 B2 * | 2/2016 | Liang | ............... | G06F 1/1632 |
| 9,483,076 B2 * | 11/2016 | Liang | ............... | G06F 1/1669 |
| 9,507,384 B2 * | 11/2016 | Liang | ............... | G06F 1/1656 |
| 9,625,951 B2 * | 4/2017 | Liang | ............... | G06F 1/1662 |
| 9,727,092 B1 * | 8/2017 | Gerbus | ............... | G06F 1/1681 |
| 9,910,464 B2 * | 3/2018 | Lyles | ............... | G06F 1/1681 |

* cited by examiner

HINGE STRUCTURE AND ELECTRONIC DEVICE

CROSS-REFERENCE TO RELATED APPLICATION

This application claims the priority benefits of U.S. provisional application Ser. No. 62/441,946, filed on Jan. 3, 2017 and U.S. provisional application Ser. No. 62/448,353, filed on Jan. 19, 2017. The entirety of each of the above-mentioned patent applications is hereby incorporated by reference herein and made a part of this specification.

BACKGROUND

Technical Field

The invention is related to a hinge structure and an electronic device, especially to a hinge structure which may be stably rotated and an electronic device having the hinge structure.

Description of Related Art

Currently, electronic devices have continuously developed to be thinned, multi-functional, and easy to carry. Some notebook computers may be divided into two separate bodies so as to fulfill a demand that they may occasionally serve as notebook computers and as tablet computers for different purposes. And serving as a notebook computer, the two machine bodies may be allowed to rotate relative to each other through a hinge structure. It is a significant issue to design a hinge structure which may be stably rotated.

SUMMARY

A hinge structure of which a pivoting base may be stably rotated is provided in the invention.

An electronic device having the hinge structure is provided in the invention.

A hinge structure according to the invention includes a fixing component and a pivoting base. The fixing component includes a fixing base and at least three torsion hooks. The fixing base includes a first sidewall and a second sidewall opposite to each other. The at least three torsion hooks are disposed side by side between the first sidewall and the second sidewall. Each of the torsion hooks includes a fixing end portion and a pressing end portion opposite to each other. The fixing end portion of the torsion hook at center is fixed to the first sidewall of the fixing base, and the pressing end portion of the torsion hook at center is close to the second sidewall of the fixing base. The two fixing end portions of the two torsion hooks at two sides are respectively fixed to the second sidewall of the fixing base, and the two pressing end portions of the two torsion hooks at two sides are respectively close to the first sidewall of the fixing base. The at least three torsion hooks form a pivoting base groove together. The pivoting base is rotatably disposed at the pivoting base groove, and the at least three pressing end portions of the at least three torsion hooks respectively press the pivoting base.

In one embodiment of the invention, each of pressing end portions is above a pivoting center of a pivoting base.

In one embodiment of the invention, a first sidewall includes a first via, and a second sidewall includes two second vias, and each of fixing end portions includes a fixing hole.

In one embodiment of the invention, the fixing component further includes three fixing members, one of the fixing members penetrates through a first via of a first sidewall and is fixed to a fixing hole of a fixing end portion of a torsion hook at center, and the other two fixing members respectively penetrate through two second vias of a second sidewall and are fixed to two fixing holes of two fixing end portions of two torsion hooks at two sides.

In one embodiment of the invention, either of the fixing base or the pivoting base includes an arc sliding track, and the other includes a sliding block extended into the arc sliding track.

In one embodiment of the invention, a first interstice exists between the pressing end portion of the torsion hook at center and a second sidewall of a fixing base.

In one embodiment of the invention, in two torsion hooks at two sides, a second interstice exists between each of pressing end portions and a first sidewall of a fixing base.

An electronic device according to the invention includes a first machine body and a hinge structure. The hinge structure is disposed at the first machine body and includes a fixing component and a pivoting base. The fixing component includes a fixing base, a first torsion member and a second torsion member. The fixing base is fixed to the first machine body and includes a first sidewall and a second sidewall opposite to each other. The first torsion member is disposed between the first sidewall and the second sidewall and has a first fixing end portion and a first pressing end portion opposite to each other. The first fixing end portion is fixed to the first sidewall of the fixing base, and the first pressing end portion is close to the second sidewall of the fixing base. The second torsion member is disposed between the first sidewall and the second sidewall and has a second fixing end portion and a second pressing end portion opposite to each other. The second fixing end portion is fixed to the second sidewall of the fixing base, and the second pressing end portion is close to the first sidewall of the fixing base. The pivoting base is rotatably disposed in the first torsion member and the second torsion member, and the first pressing end portion and the second pressing end portion press the pivoting base, respectively.

In one embodiment of the invention, the first torsion member is a torsion hook.

In one embodiment of the invention, the second torsion member is a U-shape torsion member or a pair of torsion hooks.

The electronic device further includes a second machine body, and the pivoting base includes a machine body groove, and the second machine body is detachably inserted into the machine body groove, so as to enable the second machine body to rotate relative to the first machine body.

An electronic device according to the invention includes a first machine body, a hinge structure and a second machine body. The hinge structure is disposed at the first machine body and includes a torsion component and a pivoting base. The torsion component at least includes three torsion hooks and is disposed side by side at one side of the first machine body, and the three torsion hooks form a pivoting base groove together. The pivoting base is rotatably disposed at the pivoting base groove. The second machine body is detachably inserted onto the pivoting base.

In one embodiment of the invention, a portion of the second machine body inserted into the pivoting base includes a first magnetic member.

In one embodiment of the invention, the pivoting base includes a pivoting magnetic member, magnetically attracting the first magnetic member.

In one embodiment of the invention, a portion of the first machine body close to the pivoting base includes a second magnetic member, magnetically repelling the first magnetic member.

In one embodiment of the invention, the pivoting base extends along an axial line and includes a plurality of pivoting base magnet sets arranged along the axial line, and each of the pivoting base magnet sets includes a first magnet and a second magnet having opposite magnetic polarities.

In one embodiment of the invention, a portion of the second machine body inserted into the pivoting base includes a plurality of machine body magnet sets corresponding to these pivoting base magnet sets, and each of the machine body magnet assemblies includes a third magnet and a fourth magnet having opposite magnetic polarities.

In one embodiment of the invention, the first magnets and the third magnets are magnetically attracted to each other, and the second magnets and the fourth magnets are magnetically attracted to each other.

In one embodiment of the invention, the first machine body includes a casing and a leg fixed onto the casing.

In one embodiment of the invention, the first machine body includes an accommodating space formed between a casing and a leg and adapted to accommodate a stylus.

Based on the above, by disposing three torsion hooks side by side or by means of a combination of the U-shape torsion member at two sides (e.g., including two torsion hooks) and the first torsion member (e.g., torsion hooks) at the center of the U-shape torsion member, the hinge structure according to the invention allows the pressing end portion of the torsion hooks at center and two pressing end portions of two torsion hooks at two sides to respectively press two sides of the pivoting base, thereby providing a torsion force to the pivoting base during rotation and allowing the pivoting base to be more stably disposed at the fixing component.

To make the aforementioned more comprehensible, several embodiments accompanied with drawings are described in detail as follows.

DESCRIPTION OF THE EMBODIMENTS

Figure 1:
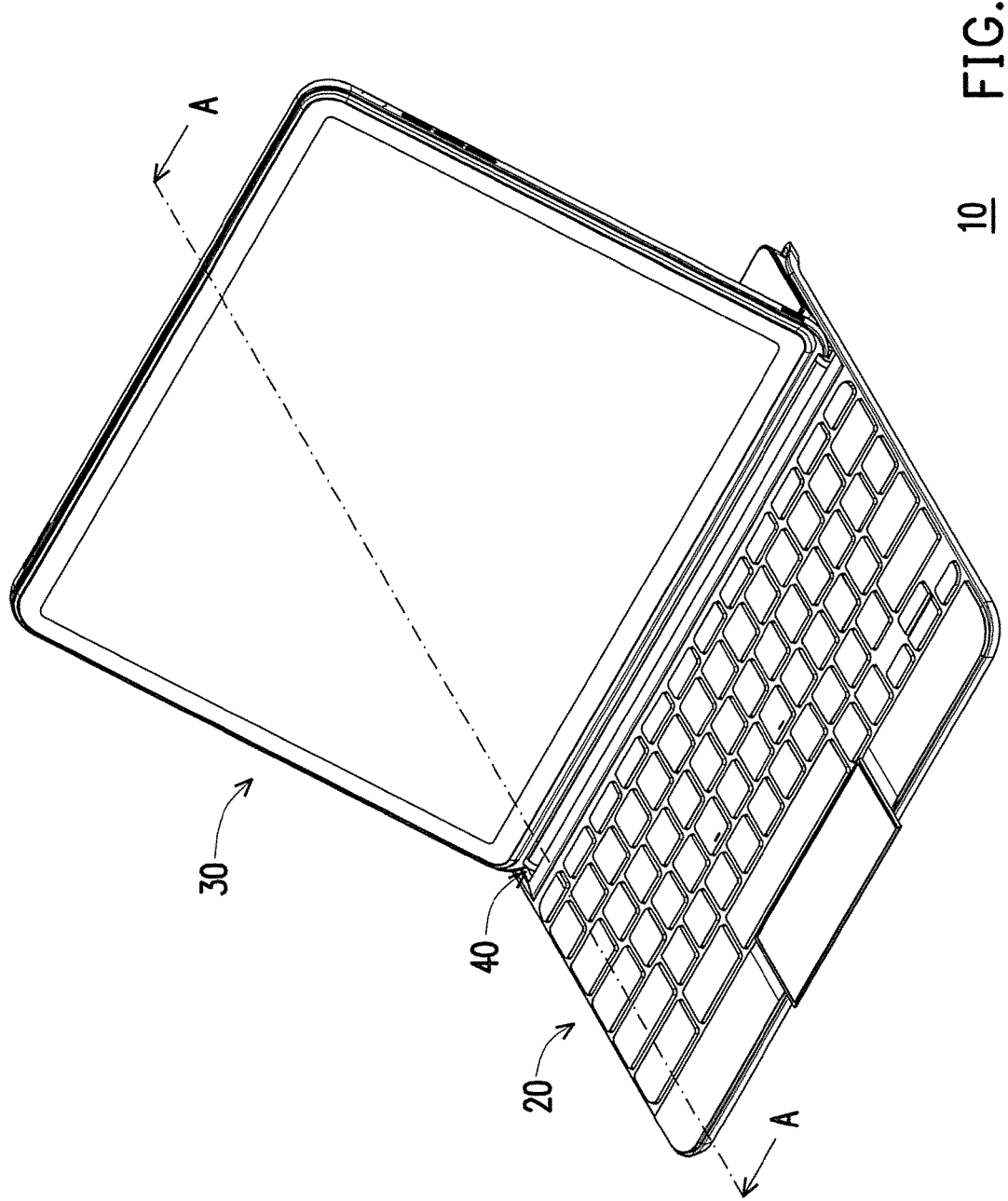
FIG. 1 is a schematic view of an electronic device according to an embodiment of the invention.
Figure 2:
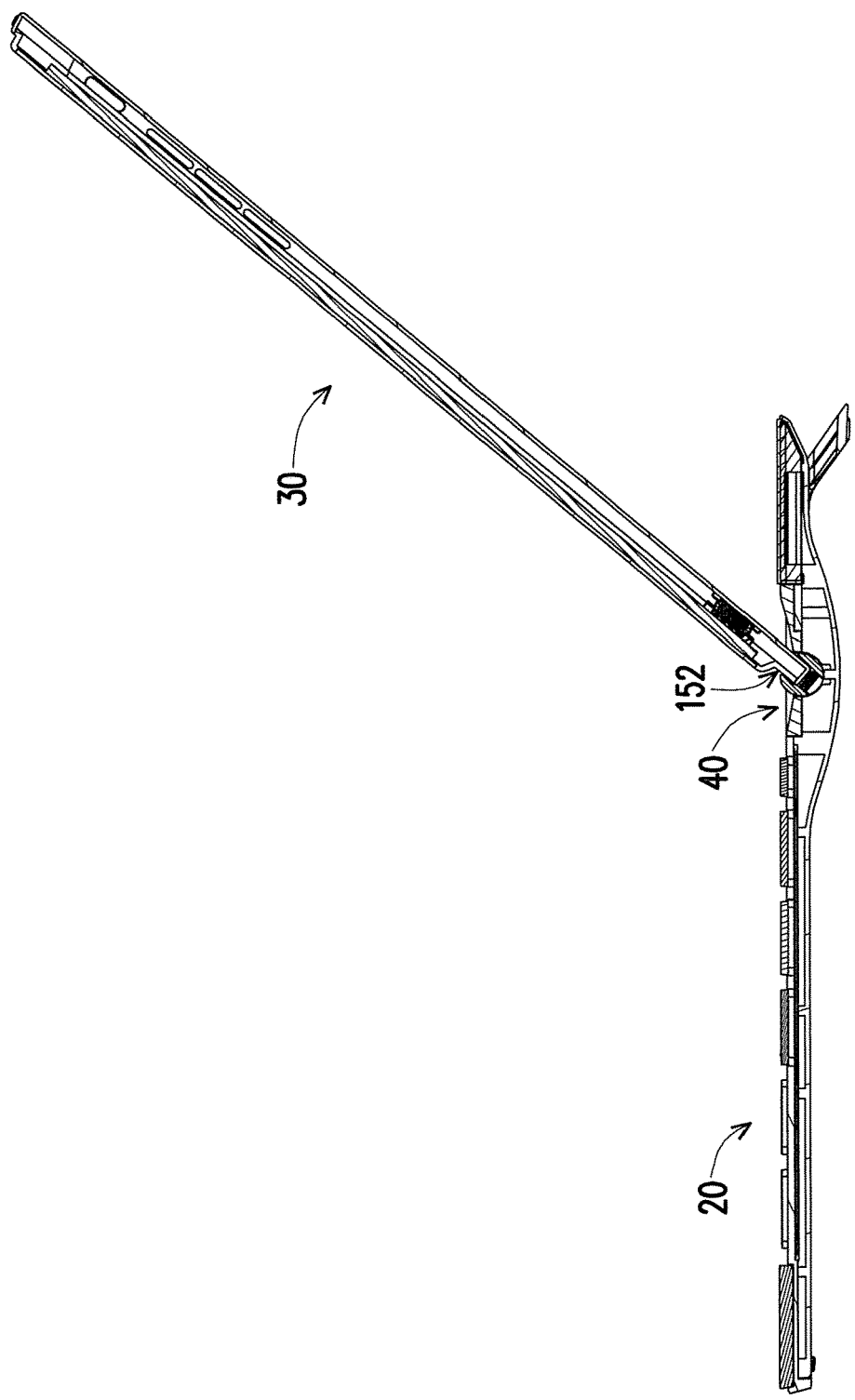
FIG. 2 is a schematic cross-sectional view of A-A line segment in FIG. 1.
Figure 3:
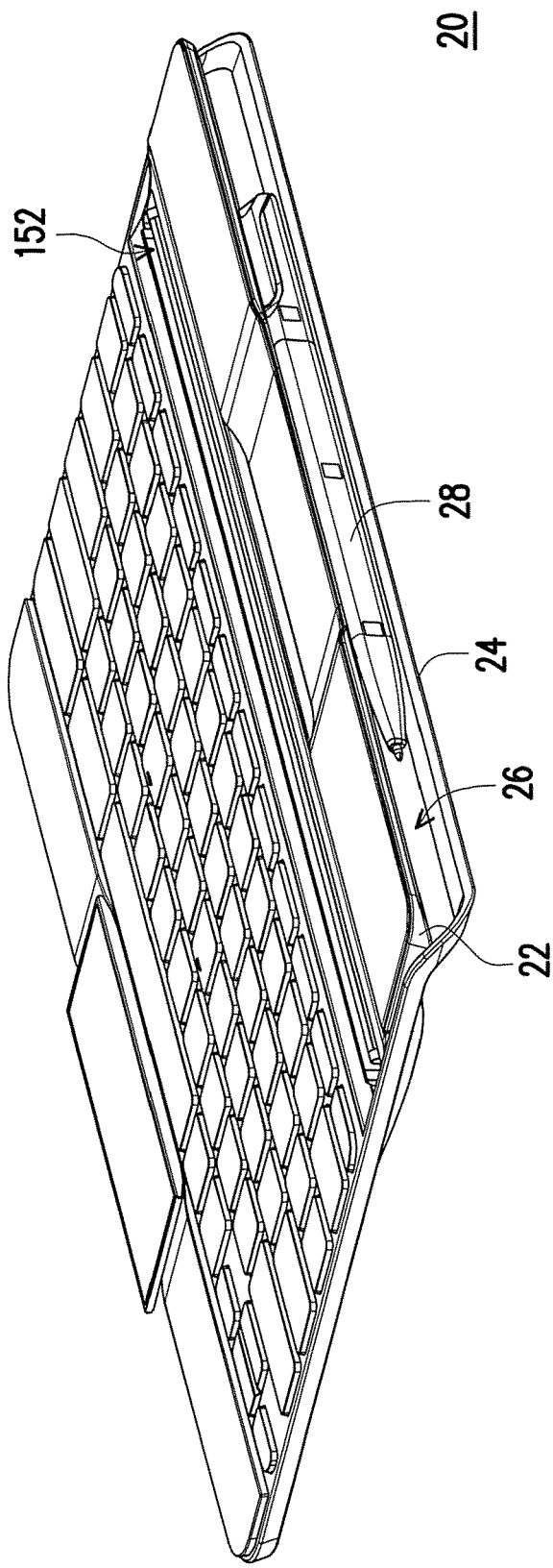
FIG. 3 is a schematic view of an electronic device in FIG. 1 after a second machine body is removed at another view angle.

FIG. 1 is a schematic view of an electronic device according to an embodiment of the invention. FIG. 2 is a schematic cross-sectional view of A-A line segment in FIG. 1. FIG. 3 is a schematic view of an electronic device in FIG. 1 after a second machine body is removed at another view angle.

Referring to FIG. 1 to FIG. 3, the electronic device 10 according to this embodiment includes a first machine body 20, a hinge structure 40 disposed at the first machine body 20, and a second machine body 30 detachably disposed at the hinge structure 40. In this embodiment, a notebook computer in which the first machine body 20 and the second machine body 30 are detachable from each other is taken as an example for the electronic device 10. The first machine body 20 is, for example, a main body of the notebook computer, the second machine body 30 is, for example, a body with a screen. However, types of the electronic device 10, the first machine body 20 and the second machine body 30 are not limited thereto. In other embodiments, the first machine body 20 may also be an extension module, and the second machine body 30 may also be a tablet computer and the like. In addition, in other embodiments, the second machine body 30 may also be selectively omitted, that is, the electronic device 10 may also only include the first machine body 20 and the hinge structure 40 disposed at the first machine body 20.

In this embodiment, the second machine body 30 may pivot relative to the first machine body 20 through the hinge structure 40. Hereinafter, the hinge structure 40 will be described in detail.

Figure 4:
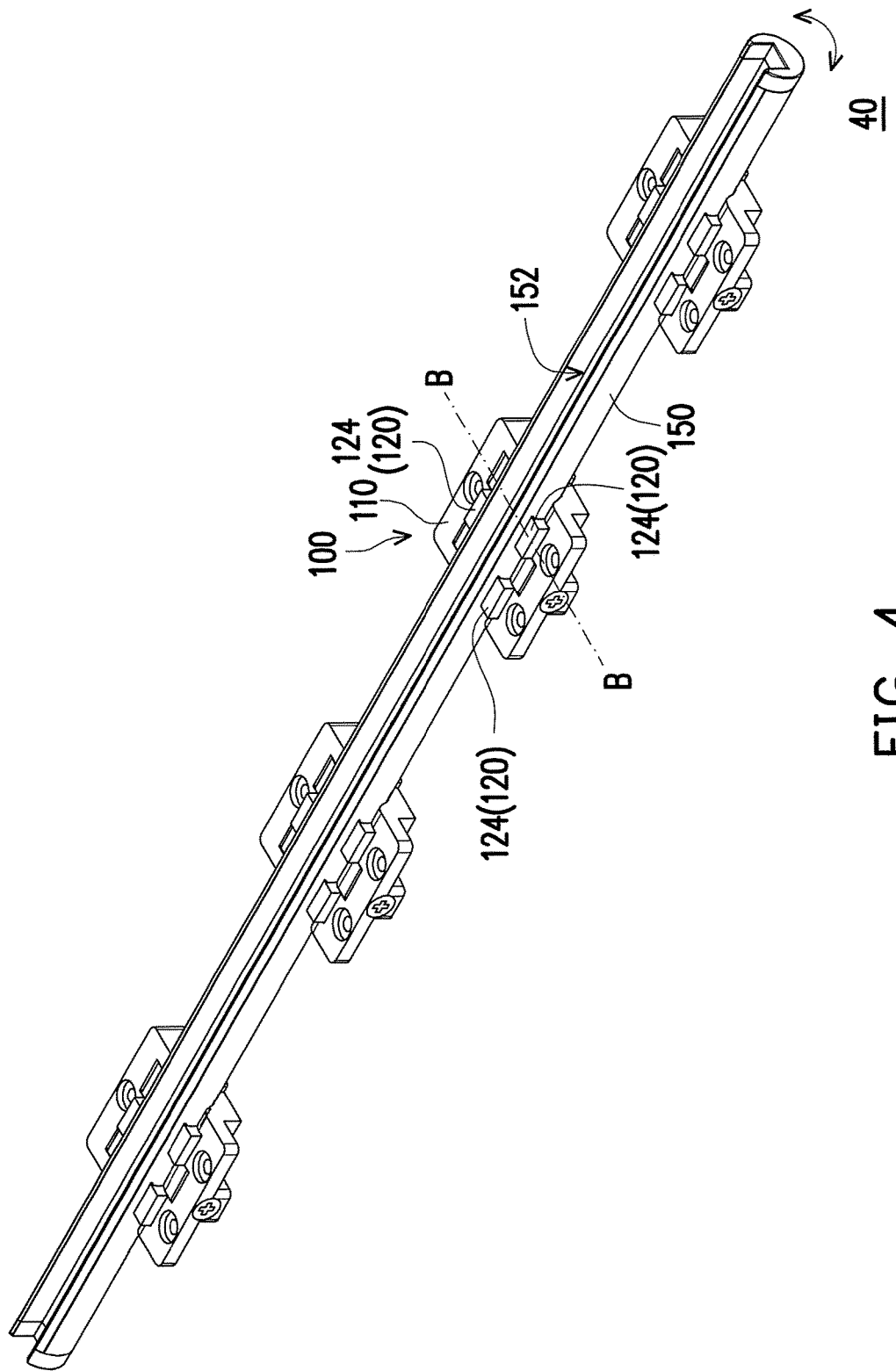
FIG. 4 is a schematic view of a hinge structure of an electronic device in FIG. 1.
Figure 5:
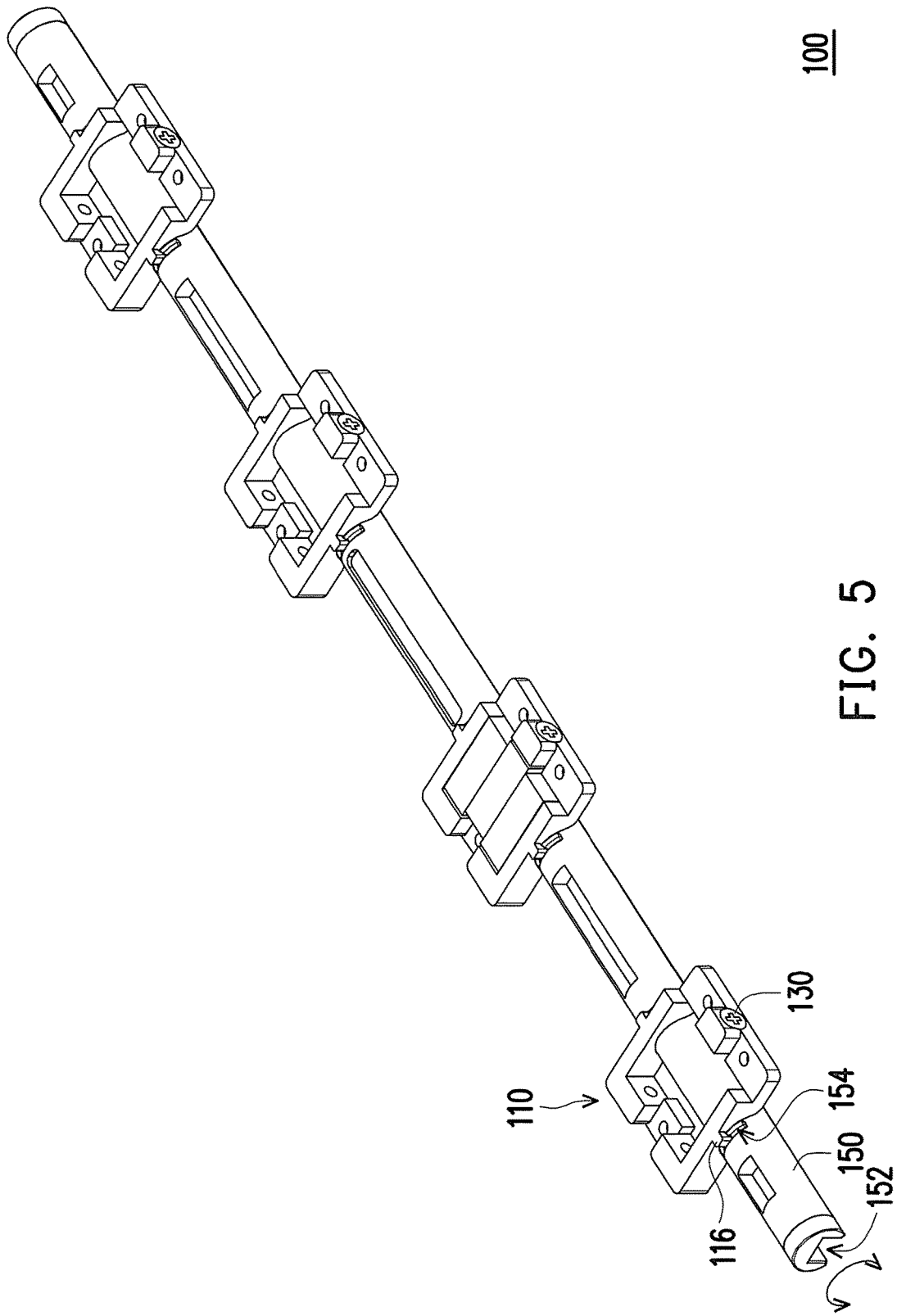
FIG. 5 is a schematic view of FIG. 4 at another view angle.
Figure 6:
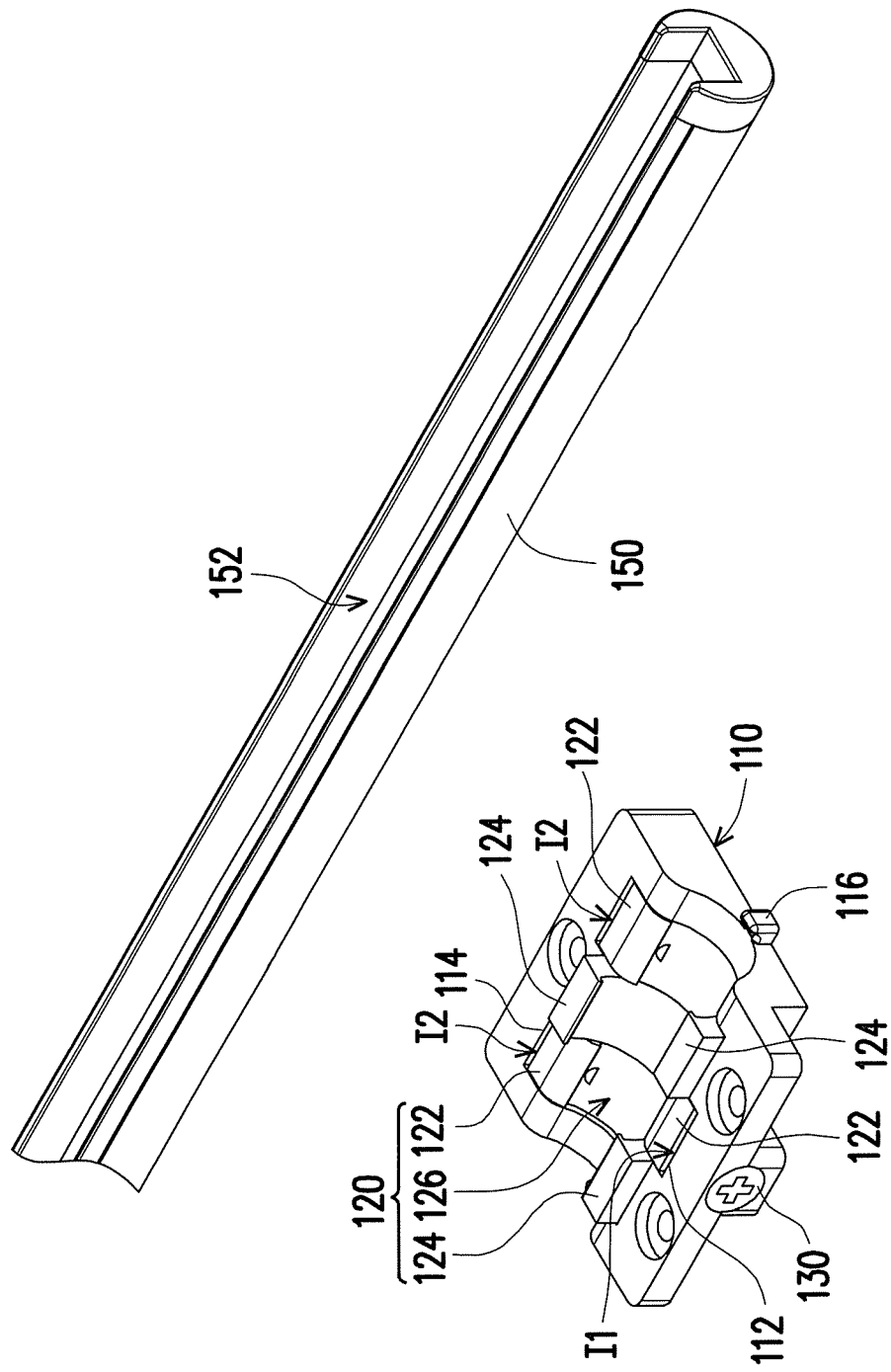
FIG. 6 is a schematic view of upward movement of a pivoting base of a hinge structure of FIG. 4.
Figure 7A:
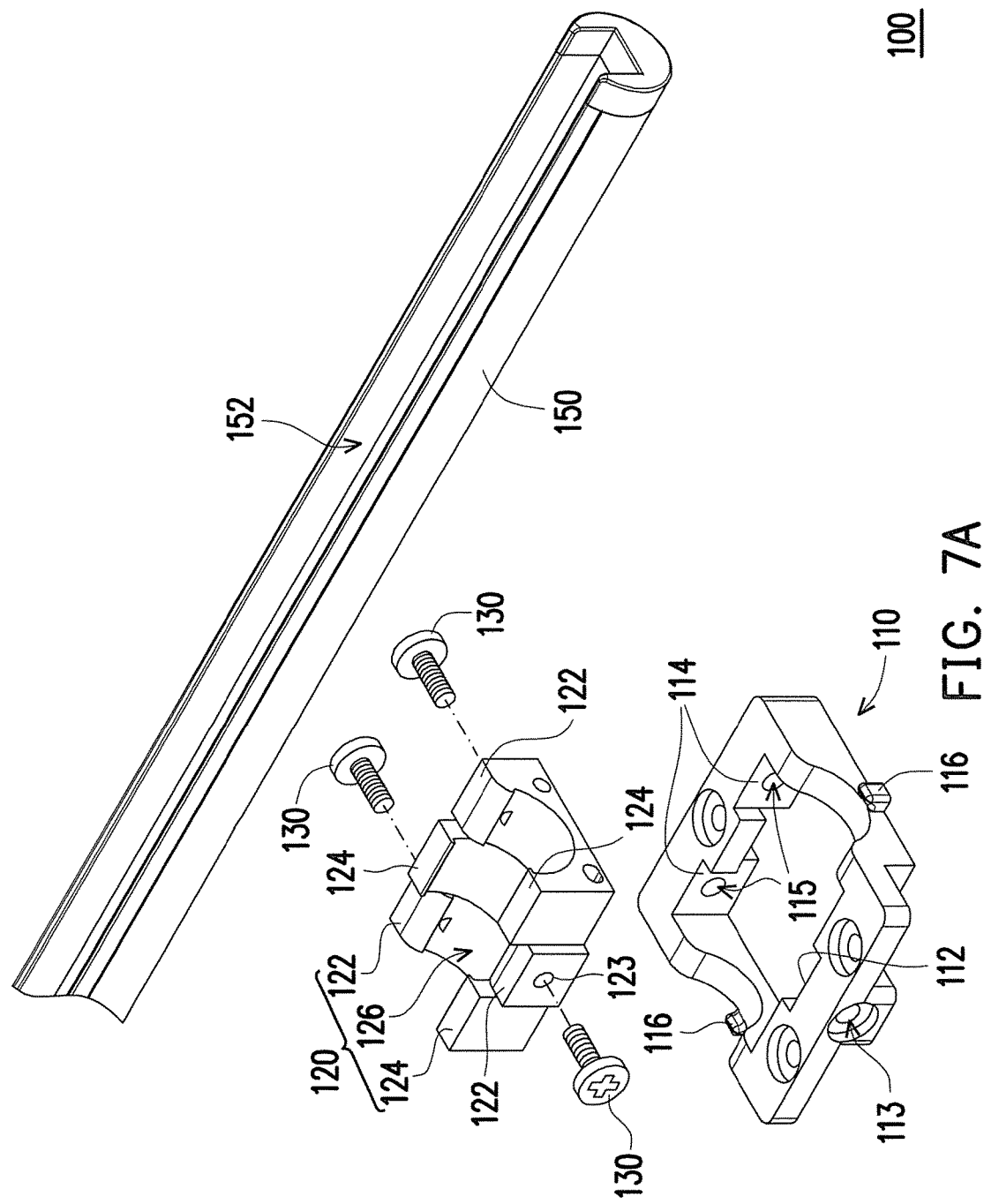
FIG. 7A is a schematic exploded view of a hinge structure of FIG. 4.

FIG. 4 is a schematic view of a hinge structure of an electronic device in FIG. 1. FIG. 5 is a schematic view of FIG. 4 at another view angle. FIG. 6 is a schematic view of upward movement of a pivoting base of a hinge structure of FIG. 4. FIG. 7A is a schematic exploded view of a hinge structure of FIG. 4.

Referring to FIG. 4 to FIG. 7A, in this embodiment, the hinge structure 40 includes at least one fixing component 100 and a pivoting base 150. In FIG. 4 and FIG. 5, for example, a number of the fixing components 100 is four, but in other embodiments, the number of the fixing components 100 may also be one or other numbers, and the number of the fixing components 100 is not limited thereto. It should be noted that, in FIG. 6 and FIG. 7A, for clarity of the drawings, only one fixing component 100 is illustrated, and other fixing components 100 are concealed.

As shown in FIG. 6 and FIG. 7A, in this embodiment, each fixing component 100 includes a fixing base 110 and at least three torsion hooks 120. It is noted that, in this embodiment, for example, a number of the torsion hooks 120 is three, but the number of the torsion hooks 120 is not limited thereto. In other embodiments, the number of the torsion hooks 120 may also be four or more. The fixing base 110 includes a first sidewall 112 and a second sidewall 114 opposite to each other. As seen in FIG. 7A, the first sidewall 112 has a first via 113, and the second sidewall 114 has two second vias 115. The three torsion hooks 120 are disposed side by side at a space between the first sidewall 112 and the second sidewall 114. In this embodiment, each of the torsion hooks 120 has an inner contour approximating to a U shape, and each of the torsion hooks 120 includes a fixing end portion 122 and a pressing end portion 124 opposite to each other, which are respectively at two ends of the U shape.

In this embodiment, when the three torsion hooks 120 are disposed side by side, the U-shape openings face the same direction, and the torsion hook 120 at center turns 180 degrees relative to the two torsion hooks 120 at two sides. That is, as seen in FIG. 7A, in this embodiment, the fixing end portions 122 of the torsion hooks 120 at center are close to the two pressing end portions 124 of the two torsion hooks 120 at two sides, and the pressing end portions 124 of the torsion hooks 120 at center are close to the two fixing end portions 122 of the two torsion hooks 120 at two sides.

Therefore, in this embodiment, when the three torsion hooks 120 are disposed at the fixing base 110, as shown in FIG. 6, the fixing end portions 122 of the torsion hooks 120 at center are fixed to the first sidewall 112 of the fixing base 110, and the pressing end portion 124 is close to the second sidewall 114 of the fixing base 110, and the two fixing end portions 122 of the two torsion hooks 120 at two sides are respectively fixed to the second sidewall 114 of the fixing base 110, and the two pressing end portions 124 are respectively close to the first sidewall 112 of the fixing base 110.

In this embodiment, the torsion hook 120 is disposed at the fixing base 110 through the fixing member 130. The fixing member 130 is, for example, a screw, but the fixing member 130 may also be a rivet or a latch, and types of the fixing member 130 are not limited thereto. Each of the torsion hooks 120 has a fixing hole 123 (e.g., a tapped hole) at the fixing end portion 122. After penetrating through the first via 113 or the second via 115 of the fixing base 110, the fixing member 130 is locked in the fixing hole 123 of the torsion hook 120, so as to fix the fixing end portion 122 of the torsion hook 120 to the fixing base 110.

More specifically, in this embodiment, one of the fixing members 130 penetrates through the first via 113 of a first sidewall 112 and is fixed to the fixing hole 123 of the fixing end portion 122 of the torsion hook 120 at center, and the other two fixing members 130 respectively penetrate through the two second vias 115 of the second sidewall 114 and are fixed to the two fixing holes 123 of the two fixing end portions 122 of the two torsion hooks 120 at two sides. In this embodiment, since the fixing member 130 is laterally locked in the fixing base 110, an entire height of the fixing component 100 may be reduced, which may be applicable to thinness of the first machine body 20.

It is noted that, in this embodiment, since the torsion hook 120 is fixed to the fixing base 110 through the fixing end portion 122, the pressing end portion 124 away from the fixing end portion 122 may be relatively flexible without being directly fixed to the fixing base 110, such that the torsion hooks 120 may be slightly deformed. As shown in FIG. 6, in this embodiment, since a distance between the first sidewall 112 and the second sidewall 114 of the fixing base 110 is slightly greater than a length of the torsion hook 120. After the torsion hook 120 is fixed to the fixing base 110, a first interstice I1 exists between the pressing end portion 124 of the torsion hook 120 at center and the second sidewall 114 of the fixing base 110, and in the two torsion hooks 120 at two sides, a second interstice I2 exists between each of the pressing end portions 124 and the first sidewall 112 of the fixing base 110. The first interstice I1 and the second interstice I2 may respectively serve to provide a corresponding space for deformation to the pressing end portion 124 of the torsion hook 120.

More specifically, in this embodiment, the three torsion hooks 120 form a pivoting base groove 126 together so as to accommodate the pivoting base 150. A distance between the fixing end portion 122 of each torsion hook 120 and the pressing end portion 124 may be smaller than a diameter of the pivoting base 150. As a result, in a process in which the pivoting base 150 is put into the pivoting base groove 126 formed by the three torsion hooks 120, the torsion hooks 120 may be slightly pushed to expand by the pivoting base 150 at first, and the first interstice I1 and the second interstice I2 provide a space for deformation to the pressing end portion 124 of the torsion hook 120, such that the pressing end portion 124 of the torsion hook 120 may accordingly turn outwardly slightly when pushed by the pivoting base 150, so as to allow the pivoting base 150 to pass through. Afterwards, the pressing end portion 124 of the torsion hook 120 returns and thus presses the pivoting base 150.

It is worth mentioning that, in this embodiment, since the torsion hook 120 at center is disposed in a manner of turning left or right 180 degrees relative to the two torsion hooks at two sides, a side of the pivoting base 150 where the pressing end portion 124 of the torsion hook 120 at center pressing the pivoting base 150 is different from a side of the pivoting base 150 where the two pressing end portions 124 of the two torsion hooks 120 at two sides pressing the pivoting base 150. More specifically, at a view angle of FIG. 4, the pressing end portion 124 of the torsion hook 120 at center presses a right side of the pivoting base 150, the two pressing end portions 124 of the two torsion hooks 120 at two sides press a left side of the pivoting base 150. Since the three pressing end portions of the three torsion hooks 120 may respectively press the two sides of the pivoting base 150, such that the pivoting base 150 is more stably disposed. In addition, the pressing end portion 124 also provides a torsion force for the pivoting base 150 during rotation.

Figure 7B:
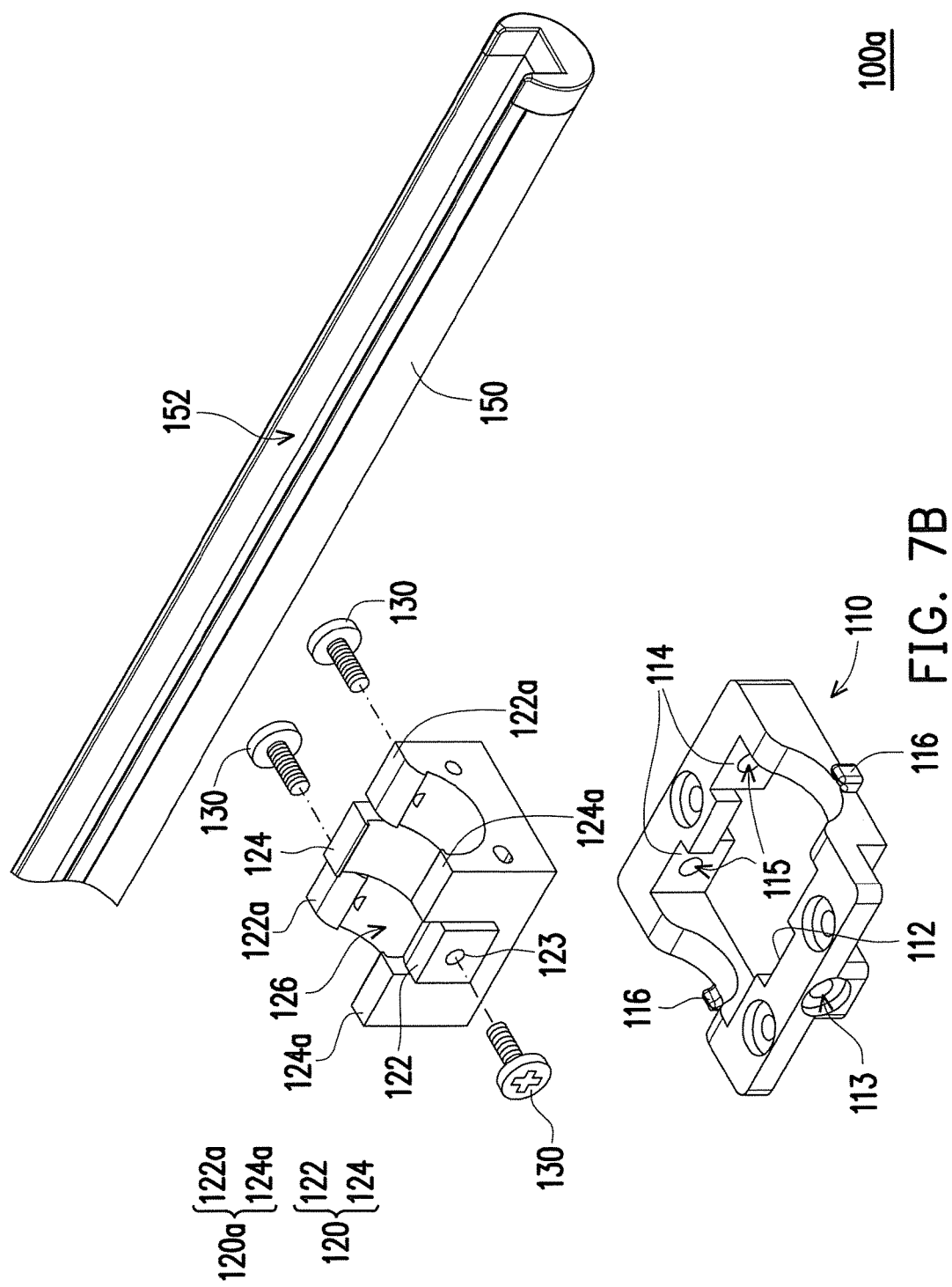
FIG. 7B is a schematic view of an hinge structure according to an embodiment of the invention.

It is noted that, a form of the fixing component 100 of the hinge structure 40 is not limited to the above. FIG. 7B is a schematic view of an hinge structure according to an embodiment of the invention. Referring to FIG. 7B, the primary difference between the fixing component 100a of the hinge structure of FIG. 7B and the fixing component 100 of the hinge structure 40 of FIG. 7B lies in that, in FIG. 7A, the three torsion hooks 120 of the fixing component 100 are torsion hooks 120 which are independent and separable from each other. In this embodiment, the fixing component 100a includes a U-shape torsion member 120a and the torsion hook 120 at a center of the U-shape torsion member 120a. In this embodiment, the U-shape torsion member 120a is close to a combination of the two torsion hooks 120 at two sides in FIG. 7A. More specifically, the U-shape torsion member 120a of FIG. 7B combines the two torsion hooks 120 at two sides in FIG. 7A together to be a single element and puts one torsion hook 120 reversely at the center of the U-shape torsion member 120a. That is, in this embodiment, the fixing component 100a is combined together with two different forms of torsion members.

Figure 8:
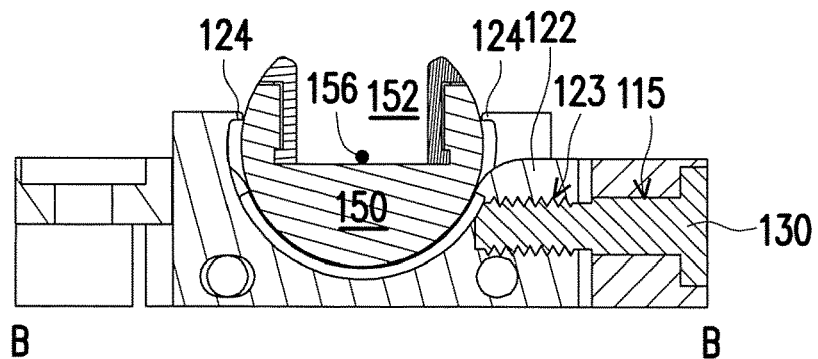
FIG. 8 is a schematic cross-sectional view of B-B line segment in FIG. 4.

Likewise, in this embodiment, a side of the pivoting base 150 where the pressing end portion 124 of the torsion hook 120 at center pressing the pivoting base 150 is at a side different from a side of the pivoting base 150 where two pressing end portions 124a of the U-shape torsion member 120a at two sides pressing the pivoting base 150, such that the pivoting base 150 is disposed more stably. In addition, the pressing end portions 124 and 124a also provide a torsion force for the pivoting base 150 during rotation. FIG. 8 is a schematic cross-sectional view of B-B line segment in FIG. 4. Referring to FIG. 8, in this embodiment, a height of the fixing end portion 122 of each of the torsion hooks 120 is close to a pivoting center 156 of the pivoting base 150, and the pressing end portion 124 is above the pivoting center 156 of the pivoting base 150. The design in which the pressing end portion 124 is above the pivoting center 156 of the pivoting base 150 enables the pivoting base 150 to be disposed more stably, so as to reduce probabilities that the pivoting base 150 pulls out during pivoting.

In addition, referring again to FIG. 5, in order to reduce probabilities that the pivoting base 150 deviates along an axial direction during rotation relative to the fixing base 110, in this embodiment, one of the fixing base 110 and the pivoting base 150 of the fixing component 100 includes an arc sliding track 154, and the other includes a sliding block 116 extended into the arc sliding track 154. More specifically, in this embodiment, the pivoting base 150 includes an arc sliding track 154, and the fixing base 110 includes a sliding block 116 extended into the arc sliding track 154. The arc sliding track 154 serves to guide a motion direction of the sliding block 116, so as to reduce probabilities that the pivoting base 150 deviates along an axial direction during rotation relative to the fixing base 110. In addition, a scope of the arc sliding track 154 may serve to limit a rotation arc degree of the pivoting base 150. For example, an extended arc degree of the arc sliding track 154 is close to an arc degree of the pivoting base 150 rotatable relative to the fixing base 110. In this embodiment, if an extended arc degree of the arc sliding track 154 is, for example, between 70 degrees and 90 degrees (e.g., 80 degrees), a rotation arc degree by which the pivoting base 150 may be relative to the fixing base 110 may also be approximately between 70 degrees and 90 degrees, such as 80 degrees. Certainly, an arc degree by which the pivoting base 150 may be rotated relative to the fixing base 110 is not limited thereto.

Figure 9:
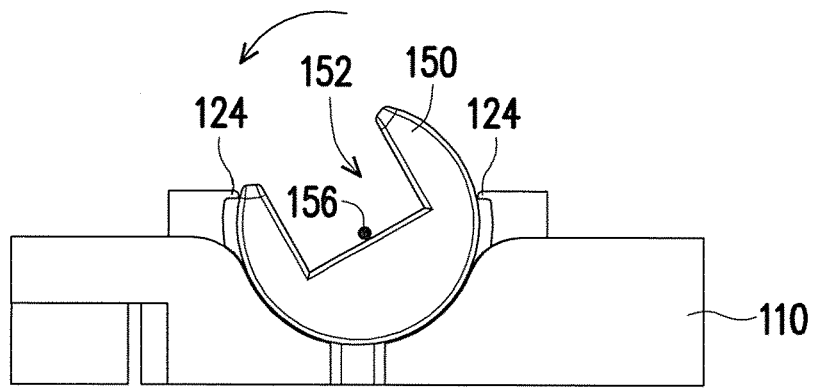
FIG. 9 and FIG. 10 are respectively views of a pivoting base of a hinge structure rotating relative to a fixing component.
Figure 10:
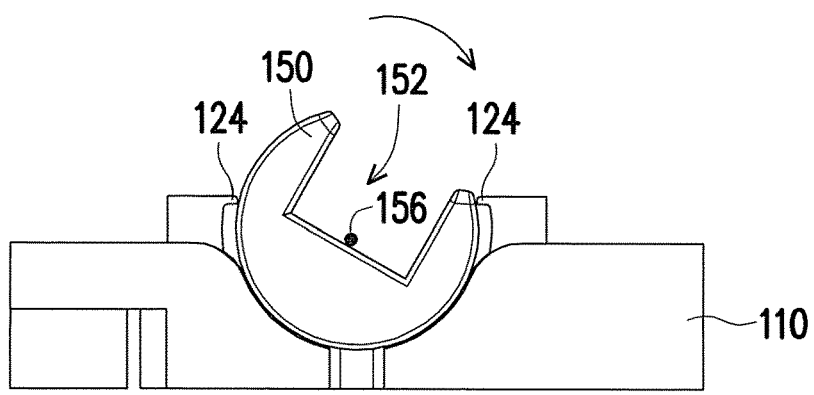

FIG. 9 and FIG. 10 are respectively views of a pivoting base of a hinge structure rotating relative to a fixing component. Referring to FIG. 9 and FIG. 10, in this embodiment, the pivoting base 150 may be rotated relative to the fixing base 110 with the pivoting center 156 as center in counter-clockwise direction by, for example, 35 degrees to 45 degrees (e.g., 40 degrees), as shown in FIG. 9, and may also be rotated relative to the fixing base 110 with the pivoting center 156 as center in clockwise direction by, for example, 35 degrees to 45 degrees (e.g., 40 degrees), as shown in FIG. 10. In this embodiment, the pivoting base 150 includes a machine body groove 152, and the second machine body 30 (illustrated in FIG. 1) is detachably inserted in the machine body groove 152, and the second machine body 30 may be rotated to a desired angle through the pivoting base 150 rotating relative to the first machine body 20 (illustrated in FIG. 1).

It is worth mentioning that, referring again to FIG. 3, in this embodiment, the first machine body 20 includes a casing 22 and a leg 24 fixed to the casing 22, and an accommodating space 26 is formed between the casing 22 and the leg 24 and adapted to accommodate a stylus 28. In this embodiment, the stylus 28 is, for example, in a shape of triangular prism, and when the stylus 28 is accommodated in the accommodating space 26 between the casing 22 and the leg 24, one side of the stylus 28 contacts the leg 24, and the other side of the stylus 28 contacts the casing 22, such that the stylus 28 may be detachably inserted and fixed between the casing 22 and the leg 24. Certainly, in other embodiments, the stylus 28 may also be fixed to the leg 24 and the casing 22 in a manner of magnetic attraction and be kept in the accommodating space 26.

Other electronic devices are described as follows. It is noted that, in the following embodiments, elements that are the same or similar elements in a previous embodiment are indicated with the same or similar numerals without repeated descriptions, and the followings are aimed to describe primary differences between different embodiments.

Figure 11:
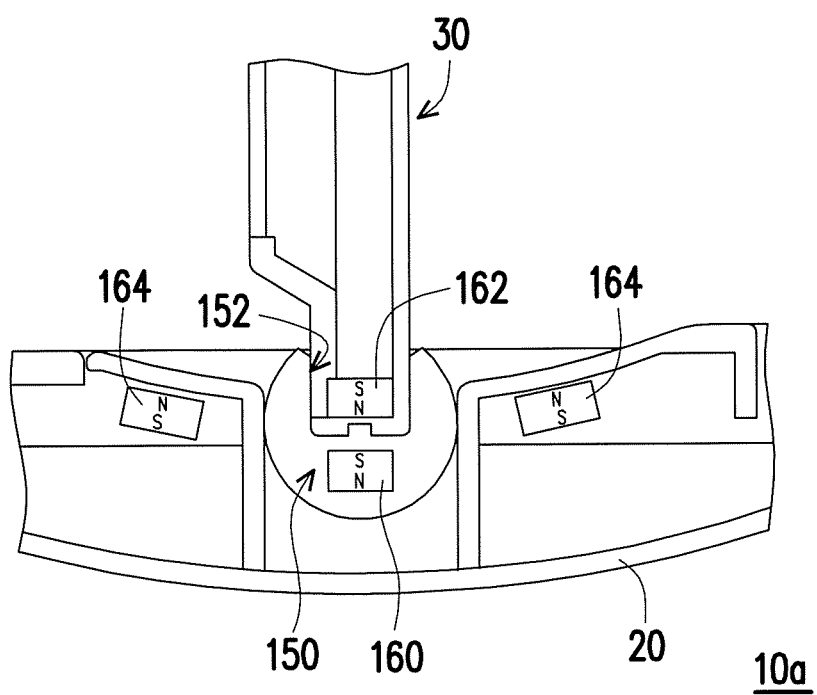
FIG. 11 is a schematic partial cross-sectional view of an electronic device according to another embodiment of the invention.

FIG. 11 is a schematic partial cross-sectional view of an electronic device according to another embodiment of the invention. Referring to FIG. 11, a primary difference between an electronic device 10*a* according to this embodiment and the electronic device 10 of FIG. 1 is that, in this embodiment, the pivoting base 150 includes a pivoting magnetic member 160, and a portion of the second machine body 30 inserted in the machine body groove 152 includes a first magnetic member 162 to which the pivoting magnetic member 160 is adapted to magnetically attract. That is, the pivoting magnetic member 160 has a magnetic polarity opposite to that of the first magnetic member 162. Alternatively, the first magnetic member 162 may be a magnet, and the pivoting magnetic member 160 may be a magnetic conductor that may be magnetically attracted, such as iron (Fe), cobalt (Co), nickel (Ni) or the like. In addition, the first machine body 20 includes a second magnetic member 164 close to the pivoting base 150 having a magnetic polarity opposite to that of the first magnetic member 162. In this embodiment, the two second magnetic member 164 having magnetic polarities opposite to that of the first magnetic member 162 are disposed respectively at two sides of the pivoting base 150 in the first machine body 20.

In this embodiment, by the above disposition, when the second machine body 30 is close to the pivoting base 150, the two second magnetic member 164 of the first machine body 20 at two sides of the pivoting base 150 provides a magnetic push to the first magnetic member 162 of the second machine body 30 and thus allows the second machine body 30 to move towards a position outside the two second magnetic members 164 (e.g., a position between the two second magnetic members 164), and the first magnetic member 162 of the second machine body 30 may be attracted to the pivoting magnetic member 160 of the pivoting base 150 and may be connected to a position in a faster and easier way.

Figure 12:
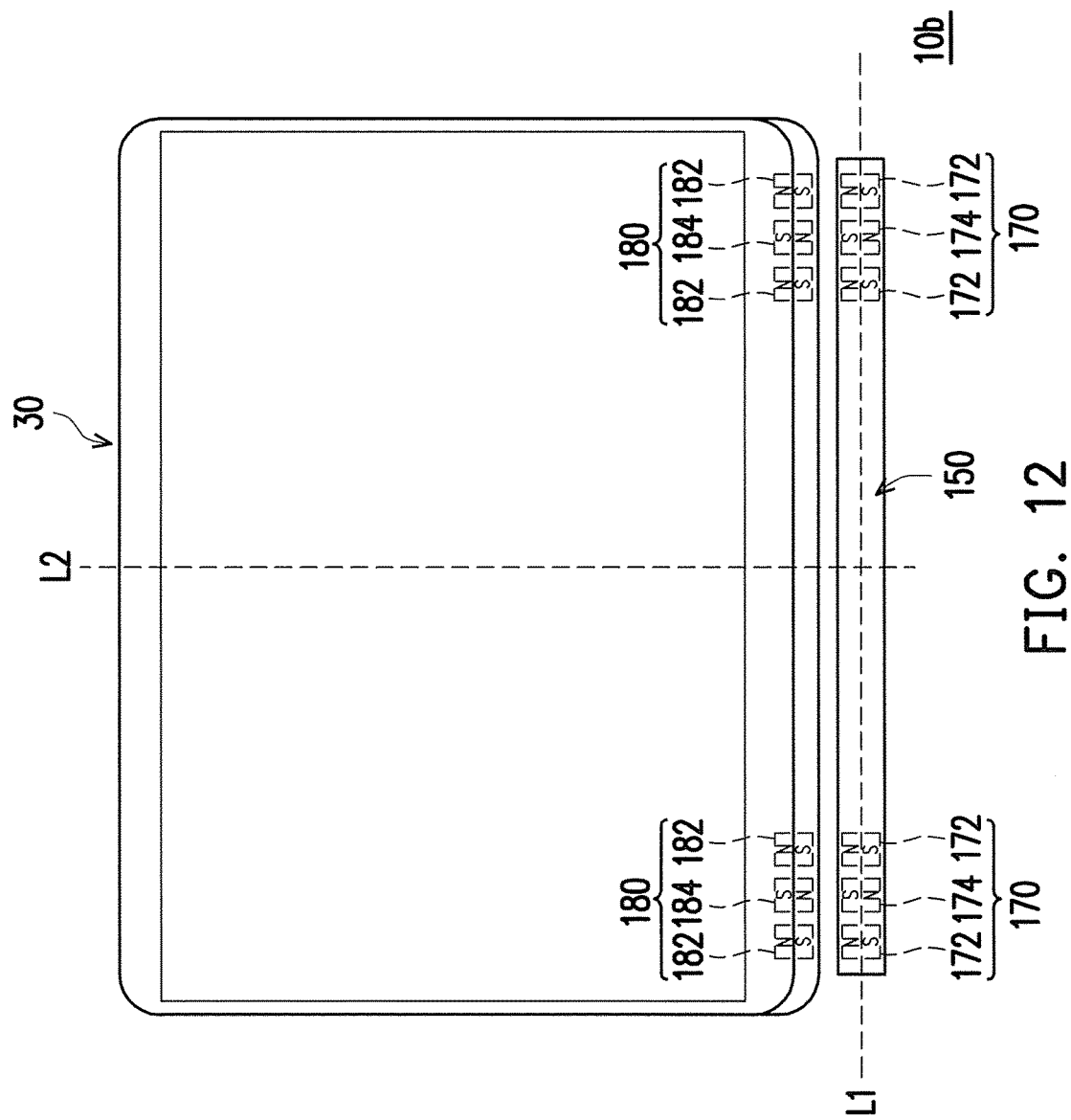
FIG. 12 is a schematic view of a pivoting base and an electronic device of an electronic device according to another embodiment of the invention.

FIG. 12 is a schematic view of a pivoting base and an electronic device of an electronic device according to another embodiment of the invention. Referring to FIG. 12, a primary difference between an electronic device 10*b* according to this embodiment and the electronic device 10 of FIG. 1 is that, in this embodiment, the pivoting base 150 includes two pivoting base magnetic sets 170, the two pivoting base magnet sets 170 are arranged along an axial line L1 on the pivoting base 150 and are located at symmetrical positions of two sides of a center line L2 of the second machine body 30, wherein the center line L2 cross-sections the axial line L1. Each of pivoting base magnet sets 170 includes at least one first magnet 172 and one second magnet 174 having opposite magnetic polarities. In this embodiment, the pivoting base magnet set 170 includes two first magnets 172 at two sides and a second magnet 174 at center.

In addition, a portion of the second machine body 30 inserted in the pivoting base 150 includes the two machine body magnet sets 180 corresponding to the two pivoting base magnet sets 170. Each of the machine body magnet sets 180 includes at least one third magnet 182 and one fourth magnet 184 having opposite magnetic polarities. In this embodiment, the machine body magnet set 180 includes the two third magnets 182 at two sides and the fourth magnet 184 at center. In this embodiment, the first magnet 172 has a magnetic polarity opposite to that of the third magnet 182, and the second magnet 174 has a magnetic polarity opposite to those of the two fourth magnets 184.

In this embodiment, when the second machine body 30 is inserted into the pivoting base 150, the third magnet 182 is attracted to the first magnet 172, and the fourth magnet 184 is attracted to the second magnet 174 and may be positioned in an easy and fast way. In addition, since the two pivoting base magnet sets 170 are located at symmetrical positions at two sides of the center line L2, no matter how a user forwardly inserts the second machine body 30 (e.g., a screen of the second machine body 30 facing a keyboard of the first machine body 20 (illustrated in FIG. 1)) or reversely inserts the second machine body 30 (e.g., a screen of the second machine body 30 facing opposite to a keyboard of the first machine body 20), the second machine body 30 may be inserted into the pivoting base 150 in a fast and easy way.

Certainly, in other embodiments, these pivoting base magnet sets 170 may also be arranged along the axial line L1 on the pivoting base 150 instead of being symmetrical at two sides of the center line L2, and the disposition of the pivoting base magnet sets 170 are not limited to the above.

In conclusion, by disposing three torsion hooks side by side or a combination of the U-shape torsion member (e.g., including two torsion hooks) at two sides and the first torsion member (e.g., torsion hooks) at center at the U-shape torsion member, the hinge structure according to the invention allows the pressing end portion of the torsion hooks at center and two pressing end portions of two torsion hooks at two sides to respectively press two sides of the pivoting base, thereby providing a torsion force to the pivoting base during rotation and allowing the pivoting base to be more stably disposed at the fixing component. In addition, in one embodiment, a pressing end portion of a torsion hook is above a pivoting center of a pivoting base, such that the pivoting base may be more stably disposed so as to reduce probabilities that the pivoting base pulls out during pivoting. The electronic device according to the invention may allow the second machine body to be inserted into the pivoting base in a fast and easy way by disposing a magnetic attractive member or a magnet set in addition to having the above hinge structure, or/and may support the second machine body to be forwardly or reversely inserted into the pivoting base, so as to cater to various demands from users.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge structure, comprising:
a fixing component, comprising:
a fixing base, comprising a first sidewall and a second sidewall opposite to each other; and
at least three torsion hooks, disposed side by side between the first sidewall and the second sidewall, each of the torsion hooks comprising a fixing end portion and a pressing end portion opposite to each other;
wherein the fixing end portion of the torsion hook at center is fixed to the first sidewall of the fixing base, and the pressing end portion of the torsion hook at center is close to the second sidewall of the fixing base;
wherein the two fixing end portions of the two torsion hooks at two sides are respectively fixed to the second sidewall of the fixing base, and the two pressing end portions of the two torsion hooks at two sides are respectively close to the first sidewall of the fixing base, and the three torsion hooks form a pivoting base groove together; and
a pivoting base, rotatably disposed at the pivoting base groove, and the three pressing end portions of the three torsion hooks respectively press the pivoting base.

2. The hinge structure of claim 1, wherein each of the pressing end portions is above a pivoting center of the pivoting base.

3. The hinge structure of claim 1, wherein the first sidewall comprises a first via, and the second sidewall comprises two second vias, and each of the fixing end portions comprises a fixing hole.

4. The hinge structure of claim 3, wherein the fixing component further comprises three fixing members, wherein one of the fixing members penetrates through the first via of the first sidewall and is fixed to the fixing hole of the fixing end portion of the torsion hook at center, and the other two fixing members respectively penetrate through the two second vias of the second sidewall and are fixed to the two fixing holes of the two fixing end portions of the two torsion hooks at two sides.

5. The hinge structure of claim 1, wherein either the fixing base or the pivoting base comprises an arc sliding track, and the other one comprises a sliding block extended into the arc sliding track.

6. The hinge structure of claim 1, wherein a first interstice exists between the pressing end portion of the torsion hook at center and the second sidewall of the fixing base.

7. The hinge structure of claim 1, wherein, in the two torsion hooks at two sides, a second interstice exists between each of the pressing end portions and the first sidewall of the fixing base.

8. An electronic device, comprising:
a first machine body; and
a hinge structure, disposed at the first machine body and comprising:
a fixing component, comprising:
a fixing base, fixed to the first machine body and comprising a first sidewall and a second sidewall opposite to each other;
a first torsion member, disposed between the first sidewall and the second sidewall and having a first fixing end portion and a first pressing end portion opposite to each other, the first fixing end portion being fixed to the first sidewall of the fixing base, the first pressing end portion being close to the second sidewall of the fixing base; and
a second torsion member, disposed between the first sidewall and the second sidewall and having a second fixing end portion and a second pressing end portion opposite to each other, the second fixing end portion being fixed to the second sidewall of the fixing base, the second pressing end portion being close to the first sidewall of the fixing base; and
a pivoting base, rotatably disposed in the first torsion member and the second torsion member, and the first pressing end portion and the second pressing end portion respectively press the pivoting base.

9. The electronic device of claim 8, wherein the first torsion member is a torsion hook.

10. The electronic device of claim 8, wherein the second torsion member is a U-shape torsion member or a pair of torsion hooks.

11. The electronic device of claim 8, further comprising:
a second machine body, the pivoting base comprising a machine body groove, the second machine body detachably inserted in the machine body groove, so as to enable the second machine body to rotate relative to the first machine body.

12. An electronic device, comprising:
a first machine body;
a hinge structure, disposed at the first machine body and comprising:
a torsion component, wherein the torsion component at least comprises three torsion hooks disposed side by side at one side of the first machine body, and the three torsion hooks form a pivoting base groove together; and
a pivoting base, rotatably disposed at the pivoting base groove; and
a second machine body, detachably inserted to the pivoting base.

13. The electronic device of claim 12, wherein a portion of the second machine body inserted in the pivoting base comprises a first magnetic member.

14. The electronic device of claim 13, wherein the pivoting base comprises a pivoting magnetic member, magnetically attracting the first magnetic member.

15. The electronic device of claim 14, wherein a portion of the first machine body close to the pivoting base comprises a second magnetic member, magnetically repelling the first magnetic member.

16. The electronic device of claim 12, wherein the pivoting base extends along an axial line and comprises a plurality of pivoting base magnet sets arranged along the axial line, and each of the pivoting base magnet sets comprises a first magnet and a second magnet having opposite magnetic polarities.

17. The electronic device of claim 16, wherein a portion of the second machine body inserted in the pivoting base comprises a plurality of machine body magnet sets corresponding to the pivoting base magnet sets, and each of the machine body magnet sets comprises a third magnet and a fourth magnet having opposite magnetic polarities.

18. The electronic device of claim 17, wherein the first magnets and the third magnets are magnetically attracted to each other, and the second magnets and the fourth magnets are magnetically attracted to each other.

19. The electronic device of claim 12, wherein the first machine body comprises a casing and a leg fixed onto the casing.

20. The electronic device of claim 19, wherein the first machine body comprises an accommodating space formed between the casing and the leg and adapted to accommodate a stylus.

* * * * *